United States Patent [19]
Jincks et al.

[11] Patent Number: 5,091,828
[45] Date of Patent: Feb. 25, 1992

[54] LIGHT BAR

[75] Inventors: Danny C. Jincks, Annapolis; John S. Davis, Town and Country; Michael D. Latta, St. Louis, all of Mo.

[73] Assignee: Public Safety Equipment, Inc., St. Louis, Mo.

[21] Appl. No.: 390,684

[22] Filed: Aug. 7, 1989

[51] Int. Cl.$^5$ .............................................. F21V 29/00
[52] U.S. Cl. ........................................ 362/35; 362/74; 362/218; 362/249; 362/373
[58] Field of Search ............... 340/463, 468, 471, 474; 362/61, 35, 227, 235, 236, 237, 238, 240, 249, 218, 373, 80.1, 74

[56] References Cited

U.S. PATENT DOCUMENTS

| | | | |
|---|---|---|---|
| 2,338,077 | 12/1943 | Scribner | 362/218 |
| 2,595,770 | 5/1952 | Crossley et al. | 362/35 |
| 3,117,302 | 1/1964 | Cardarelli et al. | 362/35 |
| 4,020,047 | 4/1977 | Burland | 362/35 |
| 4,543,622 | 9/1985 | Menke et al. | 362/238 |
| 4,574,269 | 3/1986 | Miller | 362/80.1 |
| 4,591,954 | 5/1986 | Kawamura et al. | 362/80.1 |
| 4,620,268 | 10/1986 | Ferenc | 362/237 |
| 4,626,966 | 12/1986 | Bleiwas et al. | 340/471 |
| 4,896,251 | 1/1990 | Farel | 362/80.1 |

OTHER PUBLICATIONS

1989 Federal Signal Catalog Copyright 1988, pp. 1-3, 12, 13, 65, 66.

*Primary Examiner*—Ira S. Lazarus
*Assistant Examiner*—Sue Hagarman
*Attorney, Agent, or Firm*—Senniger, Powers, Leavitt & Roedel

[57] ABSTRACT

A light bar for mounting on an emergency vehicle to provide warning light signals, comprising at least two vertically spaced lighting layers, each layer having at least one light source, the light sources on each layer cooperating to provide a transient high intensity warning light signal 360° around the light bar. The light bar may include oscillating light sources. A casing encloses the light sources, and a divider separates the light sources of at least two of the layers and divides the casing into at least two vertically spaced layers. The divider includes means for permitting air convection between the layers while blocking direct light transmission from the light sources on one layer to the other layer. The casing comprises upper and lower shell members which interfit to horizontally compress a gasket to seal the casing without screws or other fasteners penetrating the shells. The light bar preferably includes a hollow tube extending substantially the length of the light bar, for mounting the light sources. The tube may be formed by upper and lower channel shaped members. A plurality of stationary lights can be incorporated into one of the layers of the light bar, and electronically controlled to provide traffic directing signals.

44 Claims, 11 Drawing Sheets

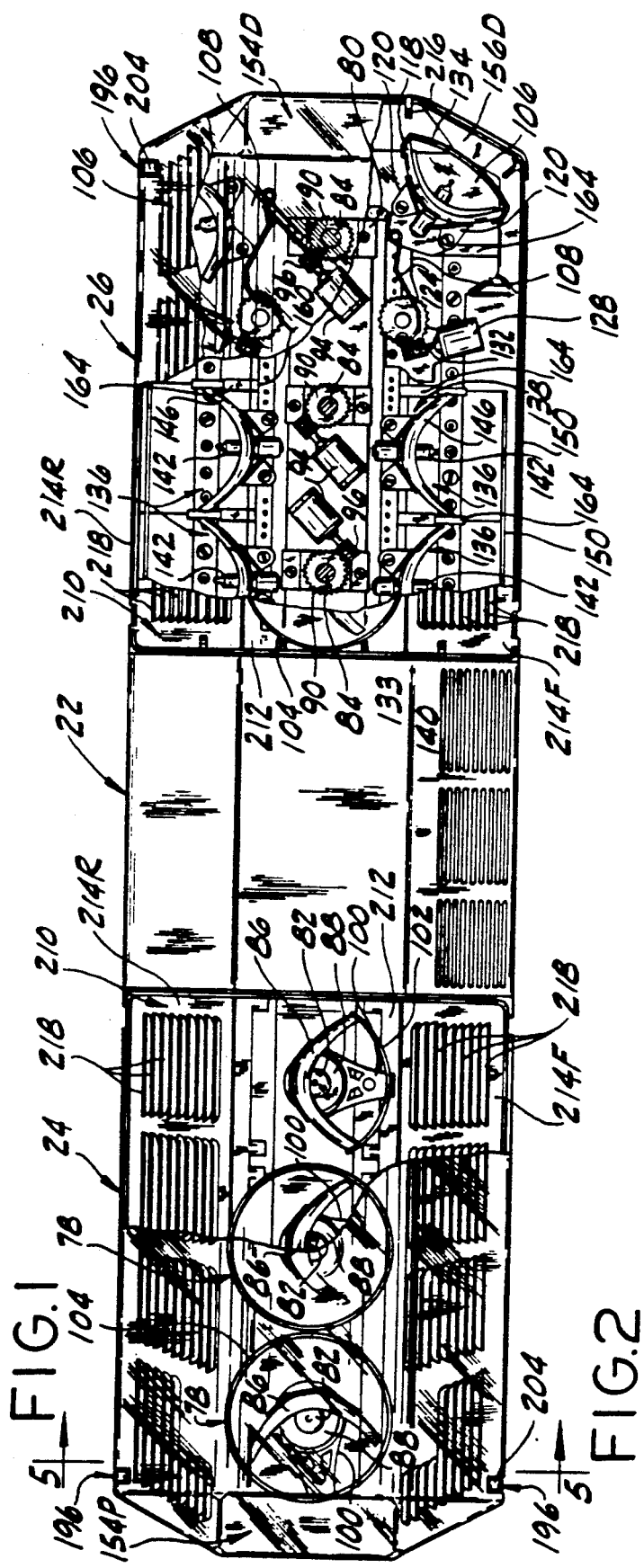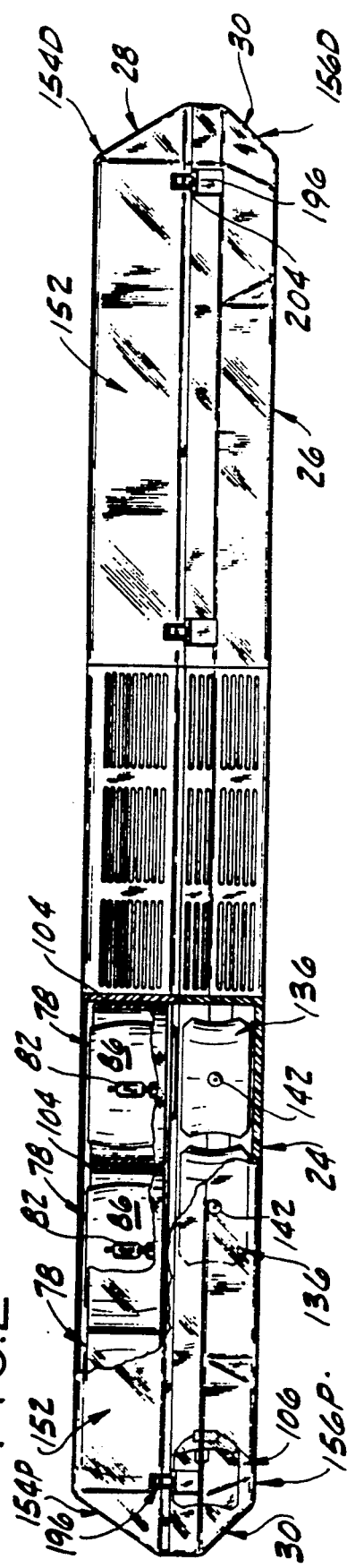

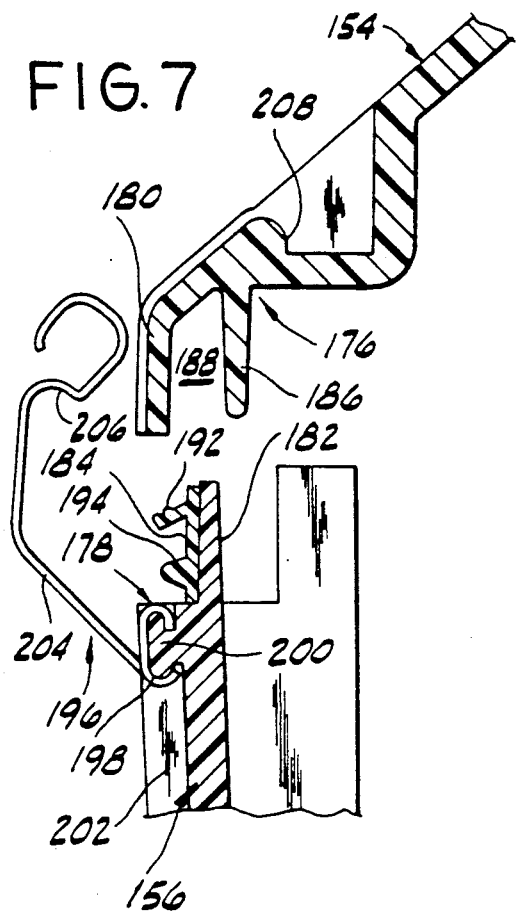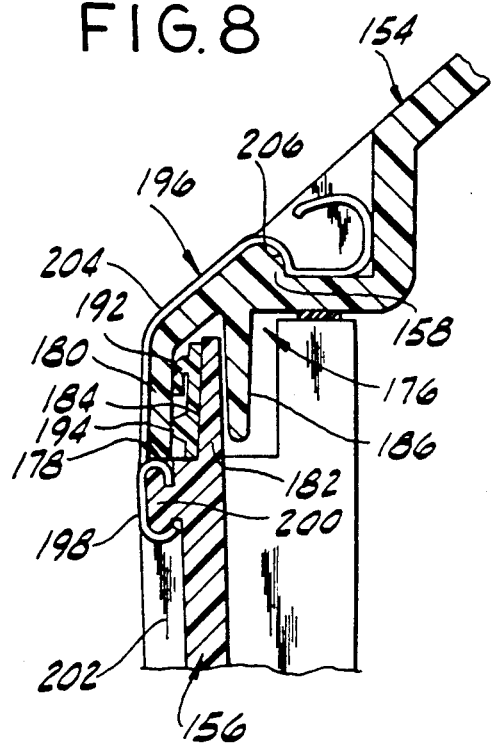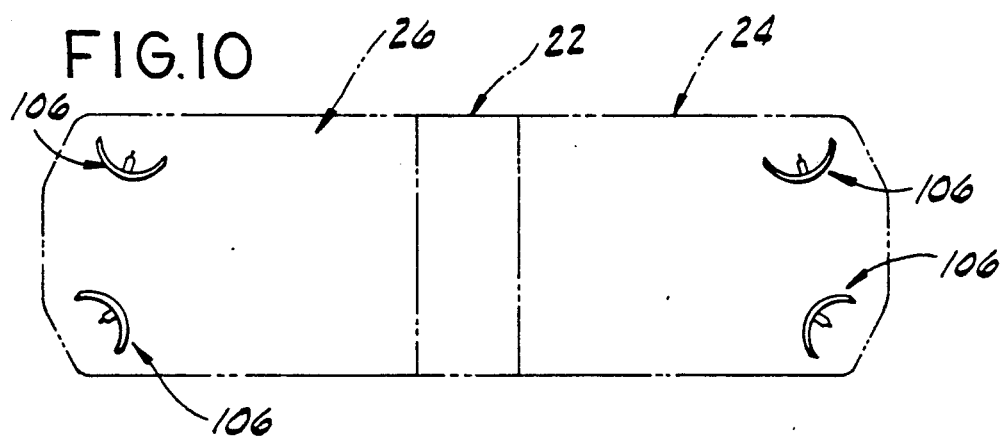

LIGHT BAR

This invention relates to light bars for mounting vehicles to provide light signals.

BACKGROUND OF THE INVENTION

Signal lights of the type used on emergency vehicles such as police cars, fire trucks, ambulances, and wreckers, have progressed from simple dome lights to elaborate light bars which include a variety of types of signaling and special purpose lights. These light bars are capable of producing a variety of light signals in various colors and patterns, each such signal having a particular purpose or significance. These light bars include many varieties of stationary, rotating, and oscillating lights.

A particular problem with existing light bars has been protecting the various light devices from the elements. Water, dirt, and road salt leaking into the light bar can damage the components. Another problem with these light bars has been the extreme heat generated by the lights, which is difficult to dissipate from a sealed light bar. The high temperatures reached inside the light bar can damage the electronic circuitry controlling the various lights. Still another problem has been providing sufficient flexibility in signal light patterns in a single light bar to meet the needs of the emergency vehicle and remain in compliance with federal, state, and local regulations on light signals. These regulations control, for example, the colors of light that can be used in particular situations. Thus it is important that the colors of the lights in the light bar are isolated.

SUMMARY OF THE INVENTION

It is among the objects of this invention to provide a light bar with more than one lighting layer; to provide such a light bar in which each layer can provide 360° of primary signal light. It is also among the objects of this invention to provide such a light bar which permits convection between the layers but prevents the direct transmission of light from the light sources on one layer to another layer, to prevent stray colors. It is also among the objects of the present invention to provide a light bar that protects the light controllers and other associated electronics from the heat generated by the lights. It is also among the objects of the present invention to provide an improved casing for such a light bar; to provide a light bar comprised of upper and lower casing members having a seal between them, and in which the sections are joined without holes through the members. It is also among the objects of the present invention to provide a light bar with oscillable lights arranged to provide a unique double flash signal.

Generally, a light bar constructed according to the principles of the present invention comprises at least two, and preferably two, vertically spaced lighting layers, each having light sources. Each layer preferably has light sources capable of providing 360° of primary light signal. The light sources for each layer comprise one or more lamps with stationary, oscillable, and rotating reflectors. The light sources are preferably enclosed in a casing, and are separated by a panel which divides the casing into layers. The panel has louvers which permit the convection of air between layers while preventing the direct transmission of light from the light source on one layer to another layer.

The light bar preferably has a hollow tube running the length of the light bar. The tube has a top surface, and a front and a back. Flanges project from the front and back of the tube. Light sources can be mounted on the top of the tube and on the flanges. The tube is preferably formed from upper and lower channel shaped members.

The light sources are preferably enclosed in a casing. The casing comprises upper and lower casing sections that interfit to enclose the light sources. The lower casing members have openings therein for receiving and mounting on the tube. The upper and lower casing members having interfitting vertical lips adapted to horizontally compress a sealing gasket between them to form a continuous seal.

In one embodiment of the invention the light bar comprises at least one oscillable light that sweeps a generally horizontal arc, the oscillable light being oriented with respect to a primary signal direction so that sweep of the arc passes though the primary signal direction with one end of the arc near the primary signal direction so that the oscillation of the light near this one end causes the appearance of a double pulse along the primary signal direction.

These and other advantages will be in part apparent and in part pointed out hereinafter.

BRIEF DESCRIPTION OF THE DRAWINGS

FIG. 1 is a top plan view of a light bar constructed according to the principles of this invention, with portions broken away to show the details of construction;

FIG. 2 is a front elevation view of the light bar;

FIG. 7 is an enlarged partial cross-sectional view of the light bar, showing in detail the interlock between the upper and lower shell members;

FIG. 8 is an enlarged partial cross-sectional view of the light bar, showing in detail the interlock between the upper and lower shell members;

FIG. 10 is an top plan view of the light bar, showing the orientation of the oscillating lights according to one aspect of this invention;

Corresponding reference characters indicate corresponding parts throughout the several views of the drawings.

DETAILED DESCRIPTION OF THE PREFERRED EMBODIMENTS

Figure 3:
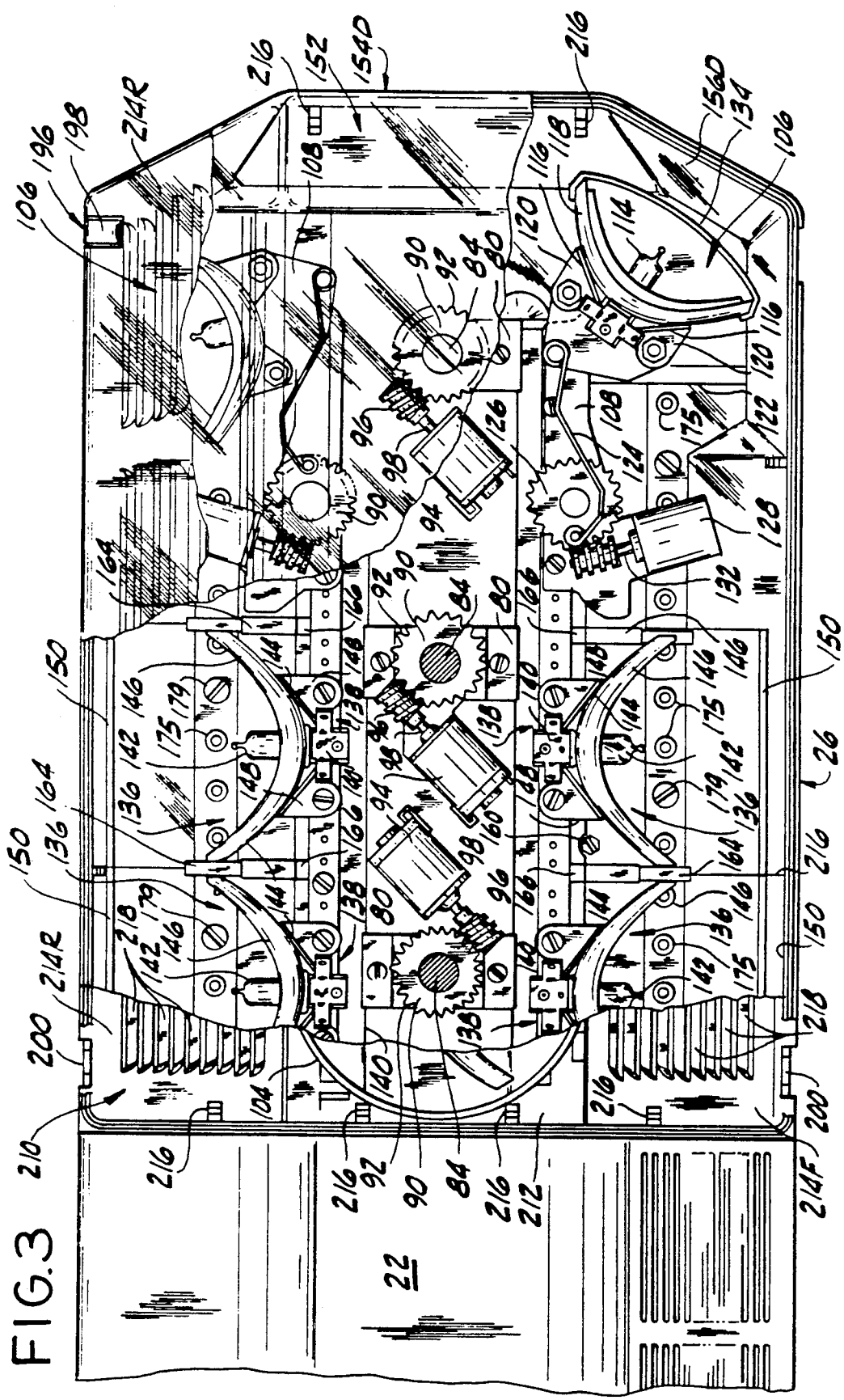
FIG. 3 is a partial top plan view of the right end of the light bar, with portions broken away to show the details of construction.
Figure 4:
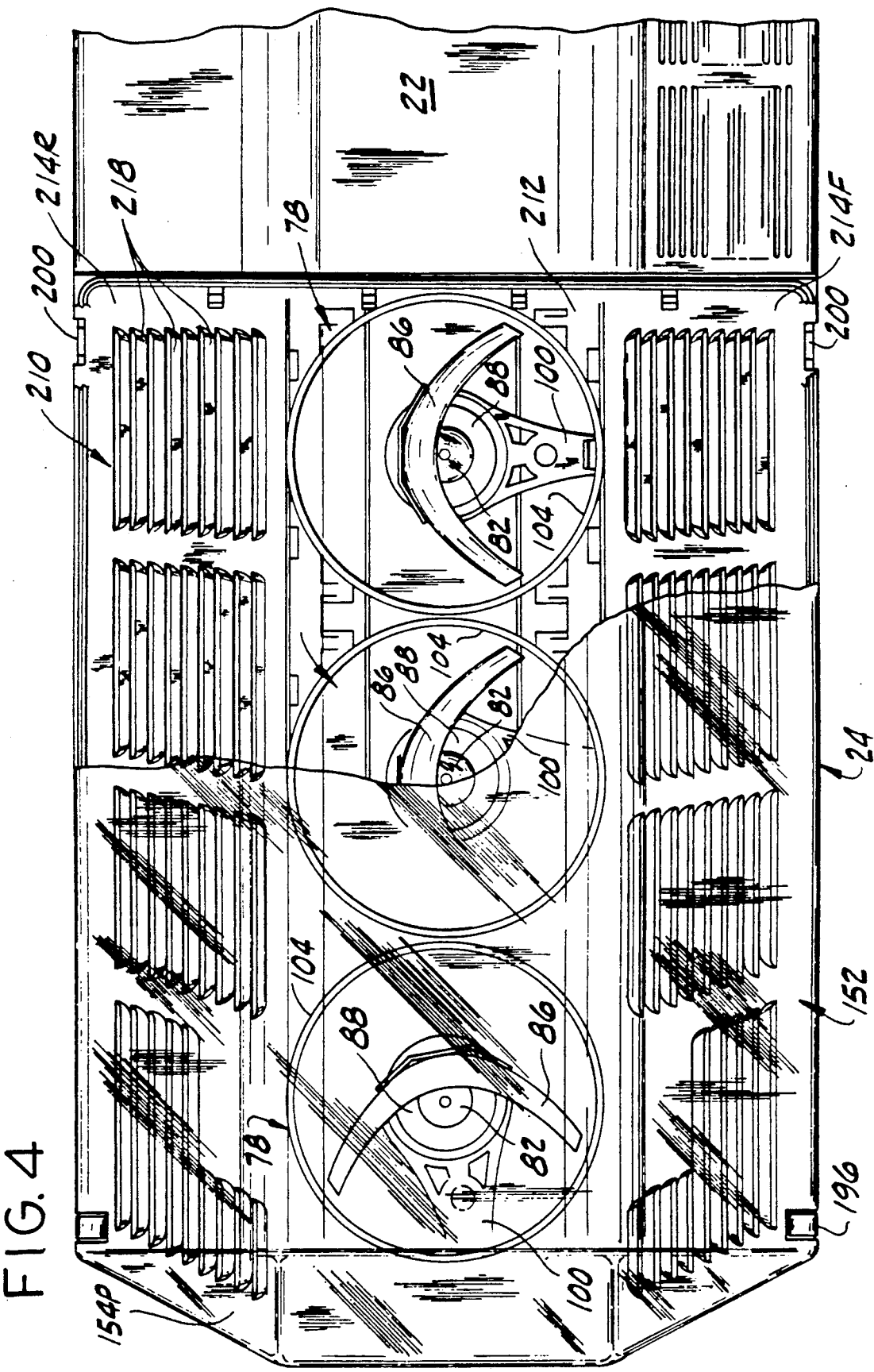
FIG. 4 is a partial top plan view of the left end of the light bar, with portions broken away to show the details of construction.

A light bar constructed according to the principles of this invention is indicated generally as 20 in FIGS. 1 and 2. The light bar 20 is adapted to be mounted transversely on an emergency vehicle, for example a police car, a fire truck, an ambulance, or a wrecker, to provide warning light signals. The light bar 20 preferably comprises an intermediate section 22, and end sections 24 and 26, hereinafter referred to as the passenger side end section and driver side end sections, respectively. These end sections 24 and 26 are preferably mirror images of one another.

Each of the end sections 24 and 26 comprises two vertically spaced lighting layers, upper layer 28 and lower layer 30, although there could be more than two lighting layers if desired. Each of the layers 28 and 30 has at least one light source, the light sources on each layer being capable of providing 360° of primary warning light signal. This means that a transient, high intensity warning signal light is visible at some point in time 360° around the light bar 20.

Figure 5:
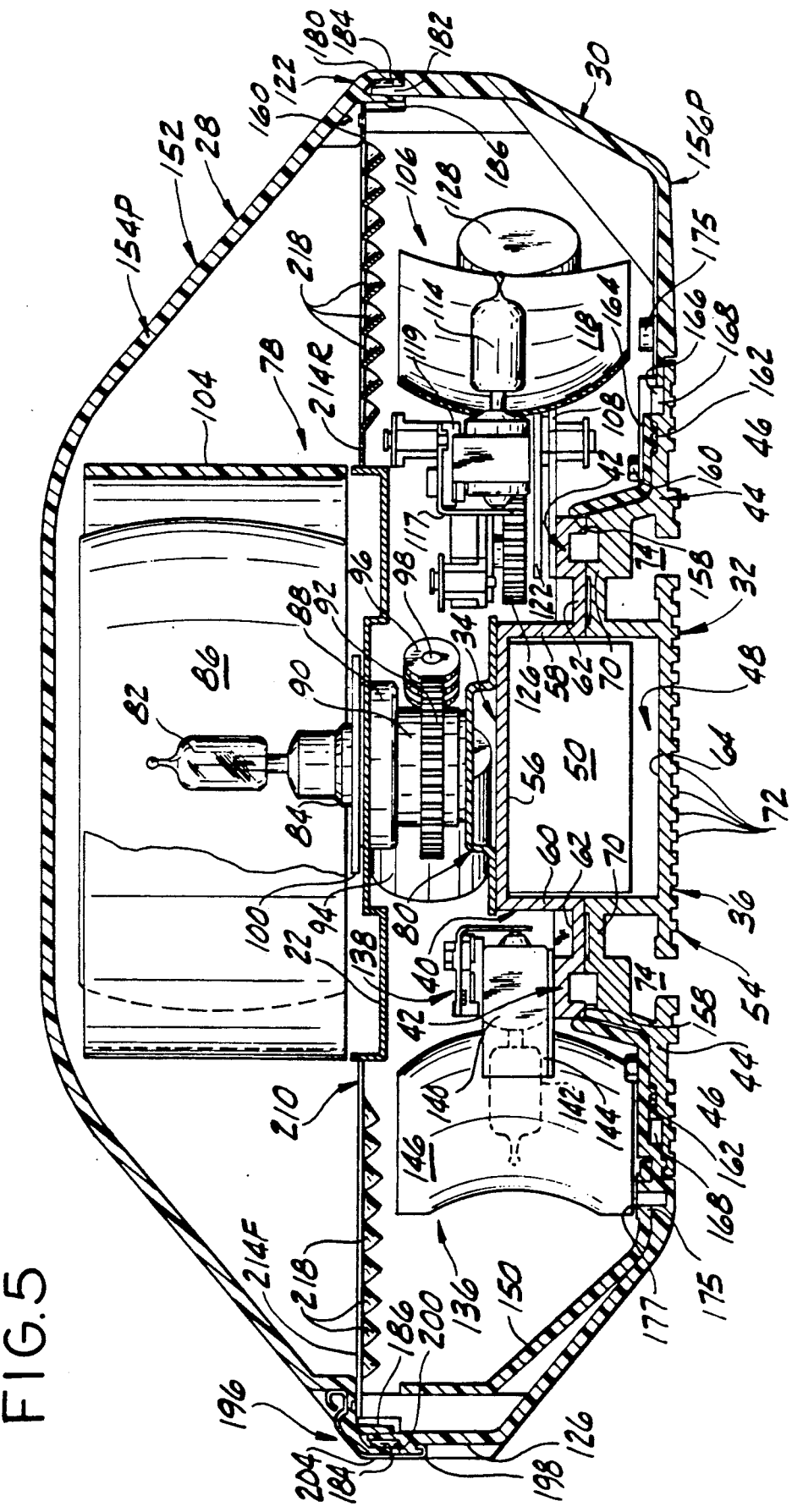
FIG. 5 is a cross-sectional view of the light bar taken generally along the plane of line 5—5 in FIG. 1.
Figure 6:
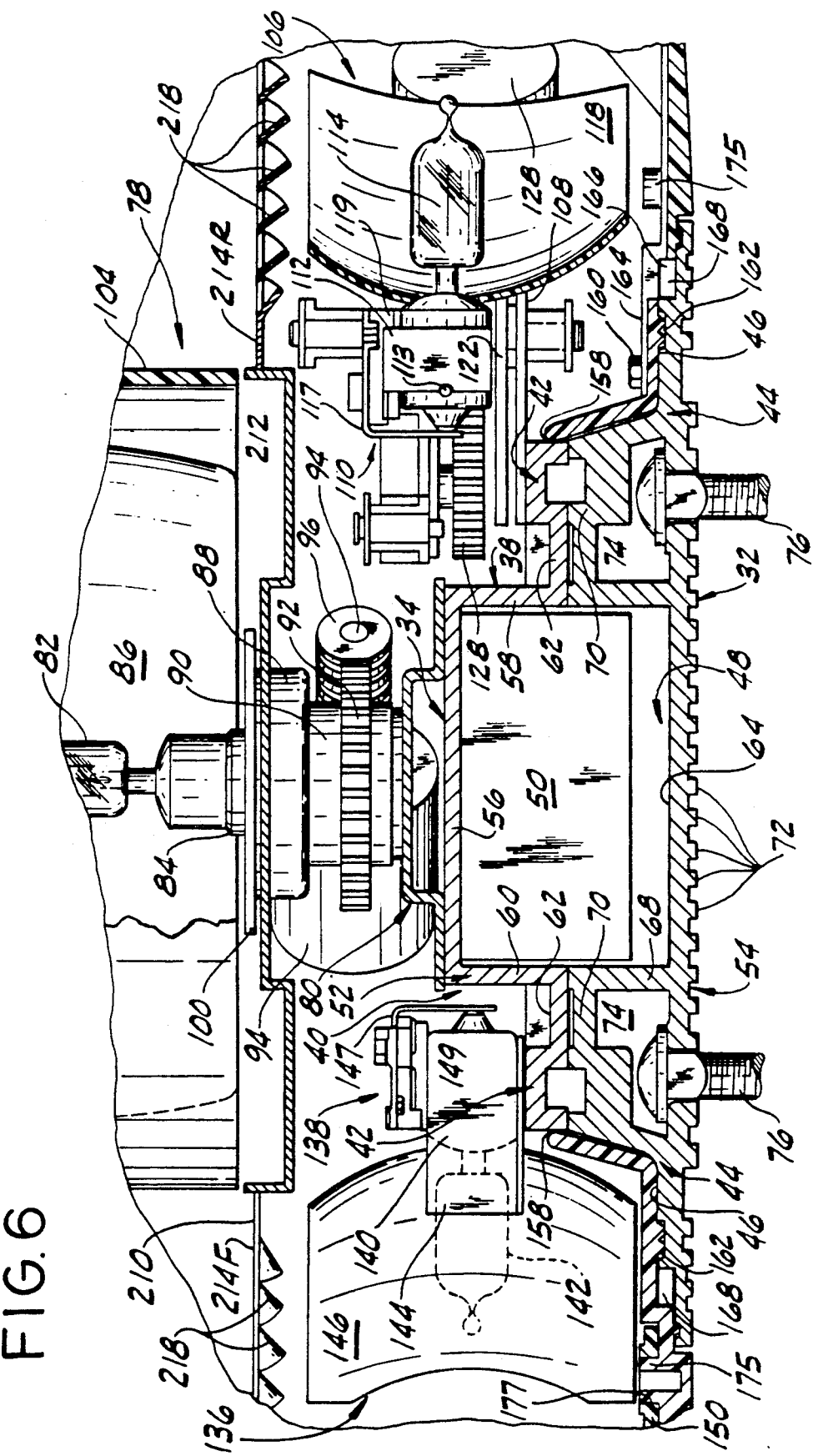
FIG. 6 is an enlarged cross-sectional view of the light bar, and in particular of the tube.
Figure 9:
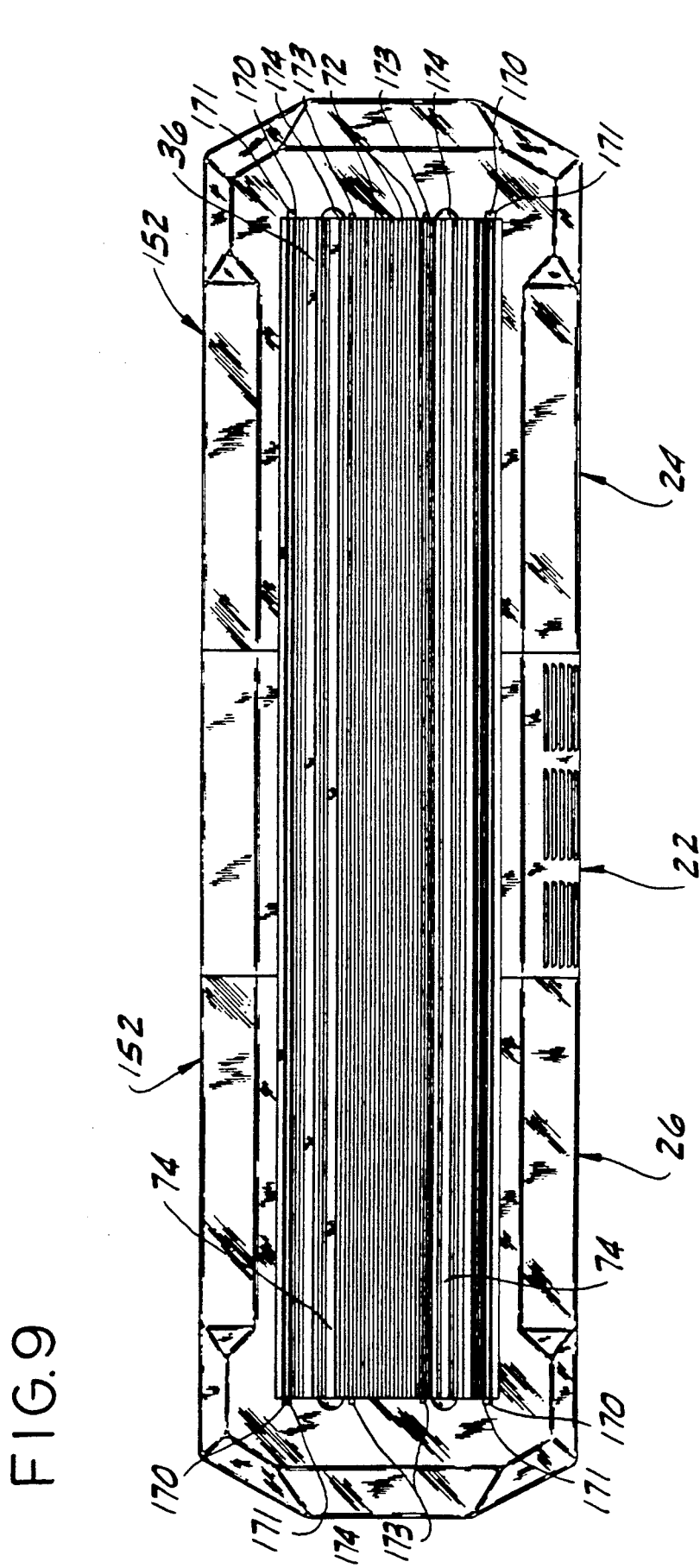
FIG. 9 is a bottom plan view of the light bar.

As best shown in FIGS. 5 and 6, the light bar 20 comprises a hollow tube 32 extending substantially the length of the light bar 20, from the driver side end to the passenger side end. The tube 32 has a top 34, a bottom 36, a front 38, and a rear 40. An upper flange 42 projects forwardly from the front 38 of the tube 32 and rearwardly from the rear 40 of the tube 32. A lower flange 44 projects forwardly from the front 38 of the tube 32 and rearwardly from the rear 40 of the tube 32. The lower flanges 44 project outwardly from the tube beyond their respective upper flanges 42, and have a generally horizontal support surface 46 positioned below the upper flanges 42.

The tube 32 defines a hollow passage 48, extending the length of the tube 32, in which control electronics packages 50 for the light sources on the various layers comprising light bar 20 can be mounted. These control packages 50 contain electronics which control when the various lights are illuminated, and the various flash patterns for the lights. The electronics 50 is heat sensitive and must be protected from the heat generated by the light sources in the light bar. The tube 32 shields the control packages 50 from the heat generated by the light sources, and also serves as a heat sink to dissipate the heat generated by the light sources.

The tube 32 preferably comprises an upper tube member 52 and a lower tube member 54, each made of extruded aluminum, for strength, light weight, and good heat and electrical conduction. The upper tube member 52 has a generally downwardly-facing channel-shaped cross-section, comprising a top 56 forming the top 34 of the tube, a front wall 58 forming the upper portion of the front 38 of the tube, and a rear wall 60 forming the upper portion of the rear 40 of the tube. A flange 62 projects forwardly and rearwardly from the lower edges of the front wall 58 and rear wall 60, forming the upper flanges 42. The lower tube member 54 has a generally upwardly-facing channel-shaped cross-section, comprising a bottom 64 forming the bottom 36 of the tube, a front wall 66 forming the lower portion of the front 38 of the tube, and a rear wall 68 forming the lower portion of the rear 40 of the tube. A flange 70 projects forwardly and rearwardly from the upper edges of the front wall 66 and the rear wall 68, forming the lower flanges 44.

The bottom surface of the bottom 36 of the tube 32 has a plurality of elongate splines 72 extending the length of the tube. These splines 72 facilitate the dissipation of heat from the tube 32. The bottom surface of the bottom 36 of the tube 32 also has front and rear tracks 74, extending the length of the tube 32 for receiving the heads of bolts 76 (FIG. 6) to secure the light bar 20 on a support (not shown) to mount the light bar 20 on an emergency vehicle.

The light sources in the light bar 20 can comprise a variety of different lighting devices including stobes, flashers, or lamps with stationary, oscillating, or rotating reflectors. In the preferred embodiment, the light sources for the upper layer 28 comprise at least one rotating reflector light unit 78. The light units 78 are mounted on the top 34 of the tube 32 with a mounting bracket 80. Each light unit 78 comprises a lamp 82 mounted in a socket in a post 84 projecting upwardly from the bracket 80. A parabolic reflector 86 is mounted on a reflector support 88 that is rotatably mounted on the post 84 so that the reflector 86 can revolve around the lamp 82 to reflect a concentrated or focused beam of light over a 360° arc. A gear unit 90, including a worm gear 92, is journaled on the post 84 below the reflector support 88. The gear unit 90 is drivingly engaged to the reflector support 88 to cause the support to rotate. The gear unit 90 is itself turned by a small electric motor 94, which is also mounted on bracket 80. A worm 96, mounted on the shaft 98 of motor 94, engages the worm gear 92 and turns the gear unit 90 and the reflector support 88, and thus the reflector 86. Rotation of the reflector 86 causes the lamp's beam to sweep a 360° arc.

The reflector support 88 includes an arm 100 that projects forwardly from the reflector 86 mounted on the support 88. A filter 102 can be mounted on arm 100 to rotate with the reflector 86. The filter 102 can be transparent, fresneled, or frosted, and can be either clear or colored. Alternatively, a cylindrical filter 104 can be mounted over the light unit 78. The cylindrical filter 104 can likewise be transparent, fresneled, or frosted, and can either be clear or colored. The filter 104 thus can serve to diffuse and/or color the beam of light. The filter 104 can also be comprised of two or more colors so that the color of the beam changes as the beam sweeps 360°.

As shown in the Figures, in the preferred embodiment there may be six units 78 in the upper layer 28. Each of these light units may have different colored filters 104, and can be separately controlled to provide visually distinct light signals. For example, two of the light units 78 (one at each end of the light bar 20) might have red filters 104, two of the light units 78 might have blue filters 104, and two of the light units 78 might have amber filters 104. Thus by separately controlling these three pairs of light units 78, the upper layer can provide at least three different signal modes—red flash, blue flash, and amber flash.

In the preferred embodiment the light sources for the lower layer 30 comprise a plurality of oscillating light units 106. The light units 106 are mounted on the upper flanges 42 of the tube 32. These units 106 comprise a base platform 108 that is secured to one of the upper flanges 42. A unitary lamp and reflector support 110 is pivotally mounted on one end of the base platform 108. This support 110 includes a box-like socket 112 for receiving a lamp 114. Lamp 114 is of the type having a cylindrical base forming one electrical contact, and a button bottom forming a second electrical contact. Pins project radially from this base of lamp 114 for mounting the lamp in a standard bayonette-type socket. The back edges of box-like socket 112 has notches 113 for engaging the pins on lamp 114. The bulb is inserted into the box-like socket with the pins on the diagonal. Once in the socket the bulb is turned to align the pins with notches 113. The support 110 includes two integral wings 116 for mounting a parabolic reflector 118. A resilient contact 117 provides the second contact for the lamp 114, and also retains the lamp 114 in the socket 112 by biasing the pins on the lamp against the back edges of the socket. The contact 117 is mounted on the socket 112, separated by an insulating spacer 119. The bottom of each wing 116 has a flange 120 for mounting the support 110 on a plate 122 that is rotatably mounted on the base platform 108. The plate 122 has a plurality of holes therein to allow the orientation of the support 110 relative to the plate 122 to be changed simply by changing which holes to mount the support on.

The plate 122 is eccentrically connected by a link arm 124 to a worm gear 126 rotatably mounted on the base platform 108. The plate 122 is connected to the worm gear 126 in such a way that rotation of the gear causes the plate to oscillate. The worm gear 126 is itself turned by a small electric motor 128, also mounted on the base platform 108. A worm 130, mounted on the shaft 132 of the motor 128, engages the worm gear 126 and turns the gear causing the plate 122, and thus the lamp 114 and reflector 118 mounted thereon, to oscillate. The oscillation of the lamp 114 and reflector 118 causes a concentrated or focused beam of light to sweep over an arc. In this preferred embodiment the arc is between about 70° and 135°.

A filter 134 can be mounted over the reflector 118. The filter 134 can be transparent, fresneled, or frosted, and can be either clear or colored. The filter 134 thus can serve to diffuse and/or color the beam of light.

The light sources on either level, but preferably the lower level 30 may also comprise one or more stationary reflector units 136. These units 136 may be secured to the upper flanges 42 of the tube 32. The units 136 comprise a unitary lamp and reflector support 138 (similar to support 110) including a box-like socket 140 for receiving a lamp 142, and two integral wings 144 for mounting a parabolic reflector 146. A resilient contact 147 provides the second contact for the lamp 142, and also retains the lamp 142 in the socket 140 by biasing pins on the lamp against the rearward edge of the socket, as described above with respect to lamp 114. The contact 147 is mounted on the socket 140 and separated by an insulating spacer 149. The bottom of each wing 144 has a flange 148 for mounting the support 138 to the flange 42, as with screws. The units 136 provide a concentrated of focused beam in the direction they are oriented. A filter 150 can be mounted in front of the reflectors 146, as described in more detail below. The filter 150 can be transparent, fresneled, or frosted and can be either clear or colored. The filter 150 thus can serve to diffuse and/or color the beam of light.

The oscillating light units 106 and the stationary light units 136 are arranged on the lower level 30 of the light bar 20 so that the coverage of their respective beams overlaps to provide 360° coverage of primary warning signal light. Additional stationary light units 136 may be provided for special purposes. For example, light units 136 may be mounted at the ends of the light bar 20 and separately controlled to serve as "alley lights" to selectively provide side lighting for the emergency vehicle. Other stationary light units 136 may be mounted on the front and/or rear of the light bar to serve as "take down lights" to selectively provide additional front or rear lighting for the emergency vehicle.

As described above, the oscillating light units 106 preferably sweep an arc of between 70° and 135°. There are a number of ways these arc can be oriented with respect to the light bar 20. For example, oscillators with 70° arcs can be mounted with respect to a primary signal direction (for example the front of the light bar 20) so that the center of the arc faces forward, along the primary signal direction. However, it is possible to achieve special effects with the orientation of the light units 106. As best shown in FIG. 10, the oscillating light units 106 may be oriented on the light bar 20 with respect to a primary signal direction (the front of the light bar 20) so that one end of the arc is nearer the primary signal direction than the other. For example, 15° beyond forward, so that the beam sweeps past forward faster at one end of the arc than at the other. Thus, at this one end, as the light unit 106 sweeps its arc, it sweeps past the primary signal direction to the end of its oscillation path, reverses and again passes through the primary signal direction, giving the appearance of a double pulse along the primary signal direction. For this reason plate 122 has a plurality of mounting holes so that the orientation of support 110 can be varied relative the to the light bar to provide this double pulse effect or to simply center the arc relative to a given signal direction.

The upper and lower light sources are enclosed in a casing 152 to protect them from water, dirt, salt, etc. The casing 152 preferably comprises at least one set of upper and lower shell members, 154 and 156 respectively, that interfit to provide a sealed enclosure for the light sources. There may be one or more sets of upper and lower shells along the length of the bar. In the preferred embodiment there are two sets of upper and lower shell members, 154D and 156D for the driver side of the light bar, and 154P and 156P for the passenger side of the light bar. The shell members are preferably made of a translucent, high impact plastic such as polycarbonate. The upper and lower shell members are preferably transparent, although the shell members or some portions of them, can be fresneled. The shell members, or some of them, could also be colored if desired, although the filters for the individual light sources are generally preferred for coloring the light.

The lower shell members 156D, 156P have openings 158 therein to receive a portion of the tube 32. The marginal edges of the lower shells 156D, 156P surrounding the openings 158 are recessed and adapted to receive and be supported by the lower flanges 44 of the tube 32. The lower shells 156D, 156P are secured to the lower flanges 44 with screws 160 extending through the shell members and into the flanges. When the light bar 20 is mounted on a vehicle the forward motion of the vehicle creates a significant amount of pressure tending to force atmospheric water into the light bar between the lower shell members and the flanges. As best shown in FIGS. 5 and 6, the edges of the lower shell members 156D, 156P and the upper surfaces of the flanges 44 are shaped to define between them a plurality of small, spaced apart chambers 162. These chambers 162 help prevent water from penetrating the light bar 20 by providing volumes at different pressures that retard the passage of water into the light bar 20.

The lower shell members 156D, 156P have a plurality of drainage channels 164 extending generally perpendicularly to tube 32 at the front and the back of the light bar. Each of the drainage channels 164 has an opening 166 which communicates with one of two drainage conduits 168 formed between the lower shell 156 and the flange 44. The drainage conduits 168 extend the length of the light bar 20, one at the front of the light bar and one at the rear of the light bar. The drainage conduits have sheltered openings 170, adjacent each end of the light bar, formed by a recess 171 in the bottom of the lower shell members 156D, 156P. The drainage channels 164 and the drainage conduits 168 cooperate to drain water from the interior of the light bar.

The lower shell members 156D, 156P have vertical end walls 172 at the ends of the openings 158 that receive the tube 32. These end walls effectively close the ends of the tube 32 and the chambers 162. There are recesses 173 in the bottom of the lower shell members 156D, 156P adjacent the ends of the tube 58 to provide positive ventilation of the tube 58 to help dissipate heat. There are also quarter-spherical recesses 174 in the bottoms of the lower shell members 156D, 156P, aligned with the tracks 74, to allow the heads of the bolts 76 to be inserted into and removed from the tracks 74.

The lower shell members 156D, 156P, have a plurality of bosses 175 on their inside bottom surface. The bosses 175 are evenly spaced and extend lengthwise of the light bar 20. The bosses 175 provide for the convenient mounting of the filters 150, which have evenly spaced openings 177 configured for receiving the bosses 175. The filters can be positioned anywhere along the length of the light bar 20 by engaging openings 177 in the appropriate set of bosses 175. The filters can be secured by screws 179 driven into the bosses.

As best shown in FIGS. 7 and 8, the upper shell members 154D, 154P have a bottom edges 176, and the lower shell members 156D, 156P have top edges 178 that are adapted to interfit. The bottom edges 176 of the upper shell members 154D, 154P have a downwardly projecting continuous lip 180, and the top edges 178 of the lower shell members 156D, 156P have an upwardly projecting continuous lip 182, one of these lips 180 or 182 is adapted to overlap the other when the upper and lower shell members interfit so that one lip is inside the other with a space between them. A continuous compressible gasket 184 having an uncompressed thickness greater than the space between the lips is disposed between the lips so that it is compressed horizontally between the lips when the upper and lower shell members interfit, thereby sealing the juncture between the upper and lower shell members. Because it is the interfit between the lips that compresses the gasket 184, the seal does not depend on an external compressive force applied to the shell members.

In the past, where a gasket has been compressed between shell members, constant force had to be applied to the shell members to maintain the compression of the gasket. This was typically accomplished by screws, clamps or other fasteners which locally held the shell members together. However, the shell members could bow in the spaces between the fasteners, causing areas of weaker compression and thus weaker sealing. The sealing configuration of the present invention does not rely on external applied force to compress the gasket, and thereby eliminates areas of weaker sealing.

Figure 13:
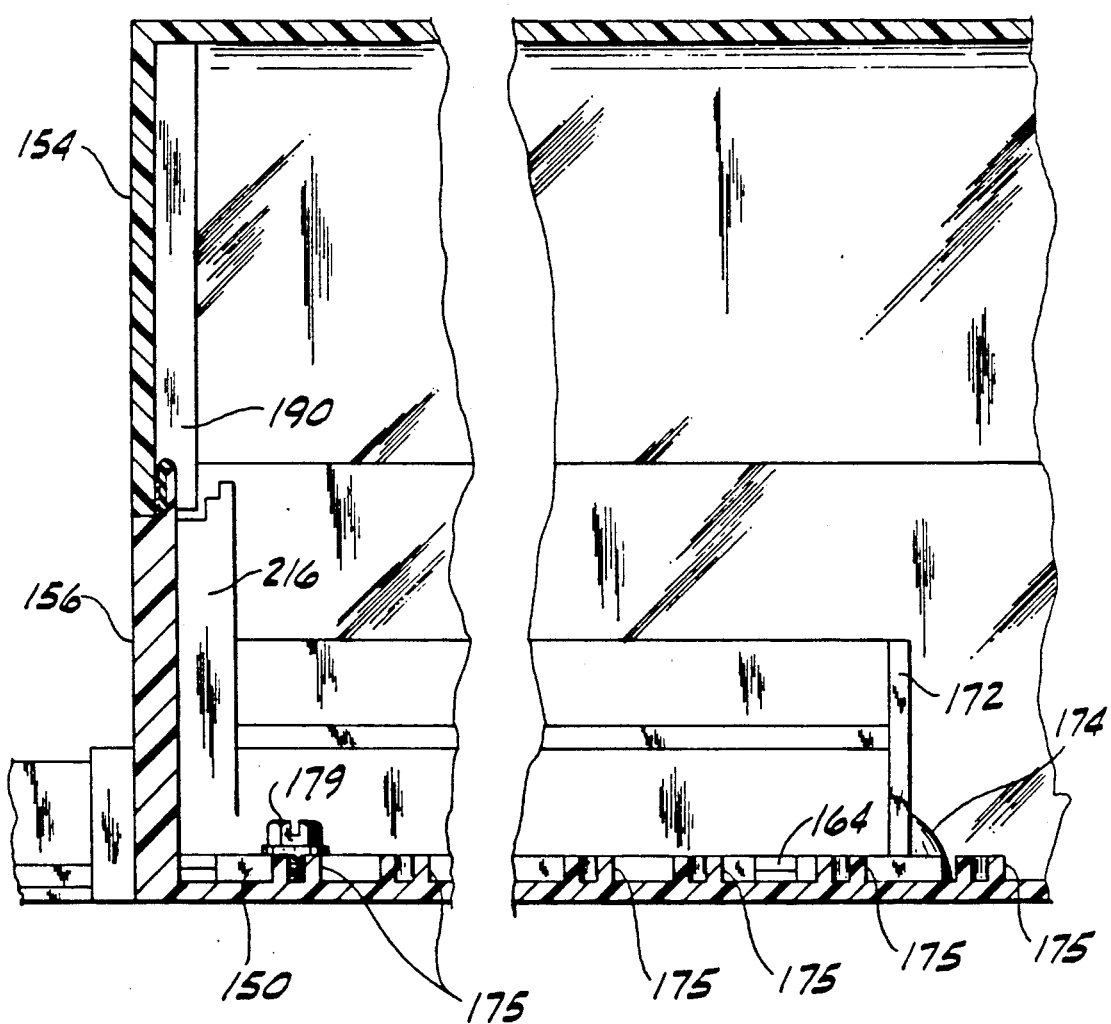
FIG. 13 is a partial cross-sectional view of the casing, with the contents removed for illustration purposes.
Figure 14:
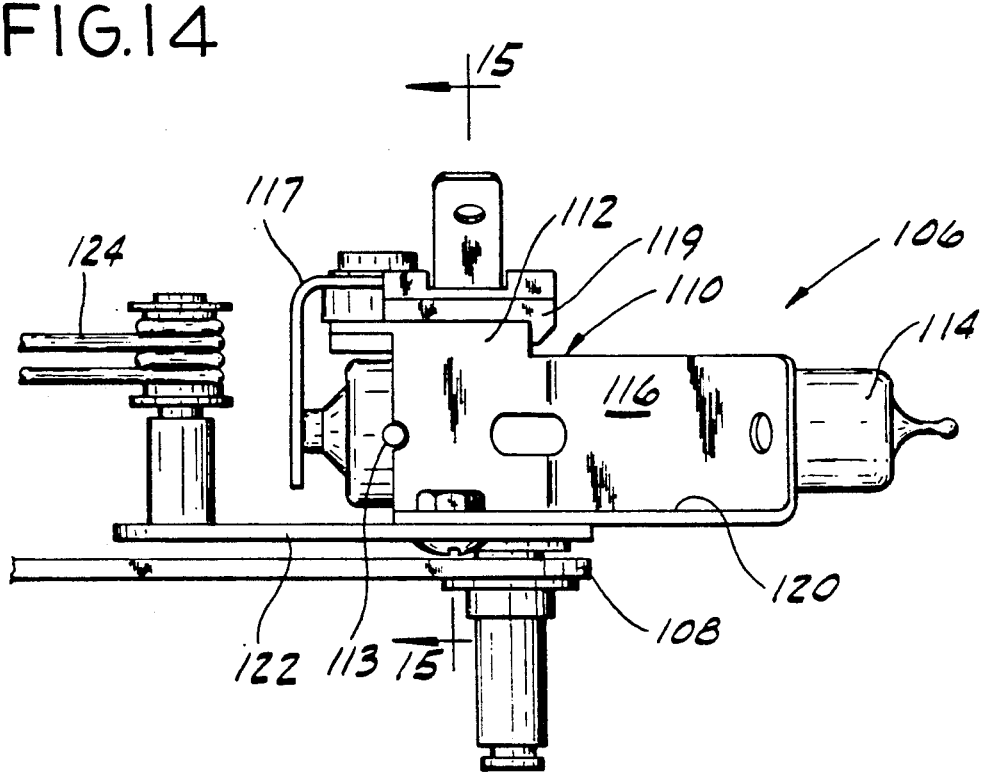
FIG. 14 is a side elevation view of a light and reflector support.
Figure 15:
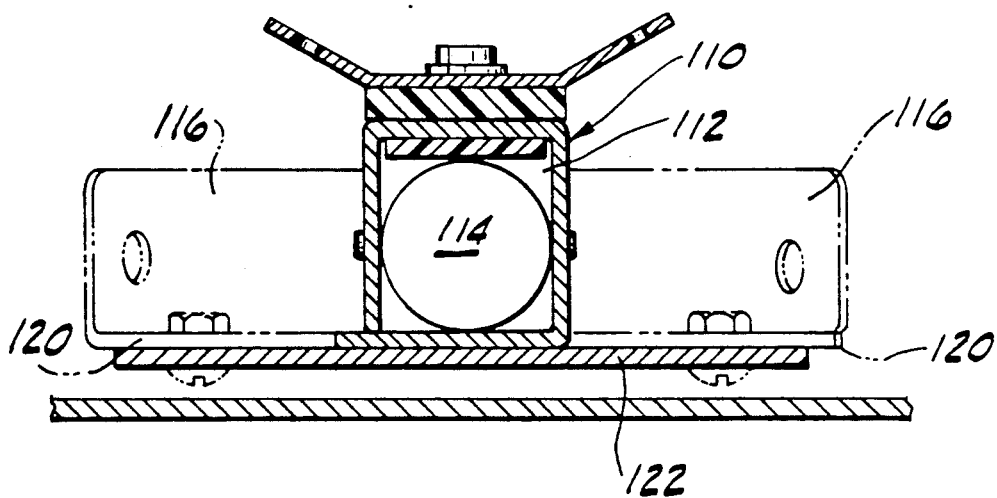
FIG. 15 is a cross-sectional view of the mount.

Preferably, the shell member having the outer lip has a backing lip to sandwich the lip of the other shell member, to maintain a tight seal. In this preferred embodiment, the backing lip extends around the front, the remote or distal end, and the rear of each shell member. On the medial side of the shell member adjacent the intermediate section 22, spaced supports are used in place of the continuous lip. Thus, as shown in FIGS. 7 and 8, the upper shell 154 has an outer depending lip 180 and inner lip 186, forming a downwardly facing U-shaped channel 188 for receiving the lip 182 on the lower shell member 156 which extends around the front, the remote end, and rear of the shell member. Supports 190 (FIG. 13) are spaced along the medial end of the upper shell members, overlapping the lip 180 to hold the lip 182 of the lower shell against the depending lip 180 on the upper shell member.

As also shown in FIGS. 7 and 8, the gasket 184 is preferably secured on the outer face of the lip 182. The gasket 184 may be a one piece closed loop, or may comprise a strip extending around the lip 180 on the lower shell member. The gasket 184 has an upper flap sealing member 192 and a lower sealing bead 194. When the upper and lower shell members interfit, as shown in FIG. 8, the lip 180 on the upper shell member 154 folds the flap sealing member 192 down, compressing it against the lip 182. Because the flap sealing member 192 is folded downwardly, water or air forced upwardly between the upper and lower shell members, actually forces the flap sealing member 192 against the lip 180, increasing the sealing force. The lip 180 also compresses the sealing bead 194 against the lip 182, and thus the gasket 184 provides a double seal between the lips of the upper and lower shell members.

The lip 186 and the supports 190 support the back of the lip 182, to maintain the compression of the gasket 184 and thereby maintain the seal. The gasket 184 provides a seal between the shell members, with only minimal interference with the light from the light sources.

Because the seal between the upper and lower shell members does not depend on an applied compressive force between the shell members, the shell members can be held together with a latches 196. These latches hold the shell members together without penetrating either shell member. Latches 196 comprise clamps 198 of generally C-shaped cross-section which clamp onto a generally horizontal external rib 200 formed in a recess 202 in the upper portion of the lower shell members. A curved resilient arm 204 is pivotally mounted to the lower shell member by the clamp 198, which holds one end of the arm 204 against the rib 200. The arm 204 has a shoulder 206 for engaging a recess 208 in the upper shell member. The resilient arm 204 has sufficient spring to be deformed so that the shoulder 206 can engage and disengage the recess 208.

Thus the upper and lower shell members are secured together without holes or other passages through the shell members that could leak. The latches 196 permit the light bar 20 to be quickly and easily opened and closed for servicing. Moreover, since the latches 196 remain attached to the shell members, there are no loose fasteners that can be lost.

A divider 210 separates the upper and lower light sources, and divides the casing 152 into the upper and lower layers 28 and 30. The divider 210 is comprised of three panels: a central panel 212, and forward and rearward Panels 214F and 214R, respectively. The divider 210 is supported by a plurality of struts 216 formed integrally with the lower shell members 156. The struts 216 hold the divider 210 in the same plane as the sealing gasket 184, so that the light output of the light bar is not impaired.

The forward and rearward panels preferably have louvers 218 formed therein which are shaped and positioned relative to the upper and lower light sources to allow air convection between the layers while blocking direct transmission of light from the light sources on one layer to the other layer. Of course, something other than louvers, for example a mesh material or baffled plates, could be used to separate the layers so long as they block the direct transmission of light but allow air to convect within the casing.

It is important to prevent light from the light sources on one layer from passing to another layer in order to comply with government regulations and eliminate extraneous colors that could cause signals to be misinterpreted. For example if the layers had different colored shell members, then light passing from one layer to another would have a different color. There are regulations regarding the appropriate colors for signal lights in given situations. Extraneous colors might violate these regulations, moreover the appearance of other colors could cause the signal to be misinterpreted. The divider 210 blocks the direct transmission of light from one layer to another while permitting the air to pass from one layer to equalize the temperature within the casing and prevent hot spots from forming. The tube 32 aids in dissipating heat generated by the light bar 20.

The light bar 20 may have lights extending its entire width, or as in the preferred embodiment, it can include an intermediate section 22, between two lighted end sections 24 and 26. The intermediate section 22 may be on one layer, for example just the upper layer or just the lower layer, or it may, as in the preferred embodiment, take up both layers. The intermediate section provides a place for mounting siren loudspeakers. The intermediate section 22 preferably comprises a sheet metal shell 220 with a plurality of openings 222 for the siren loudspeaker.

Figure 11:
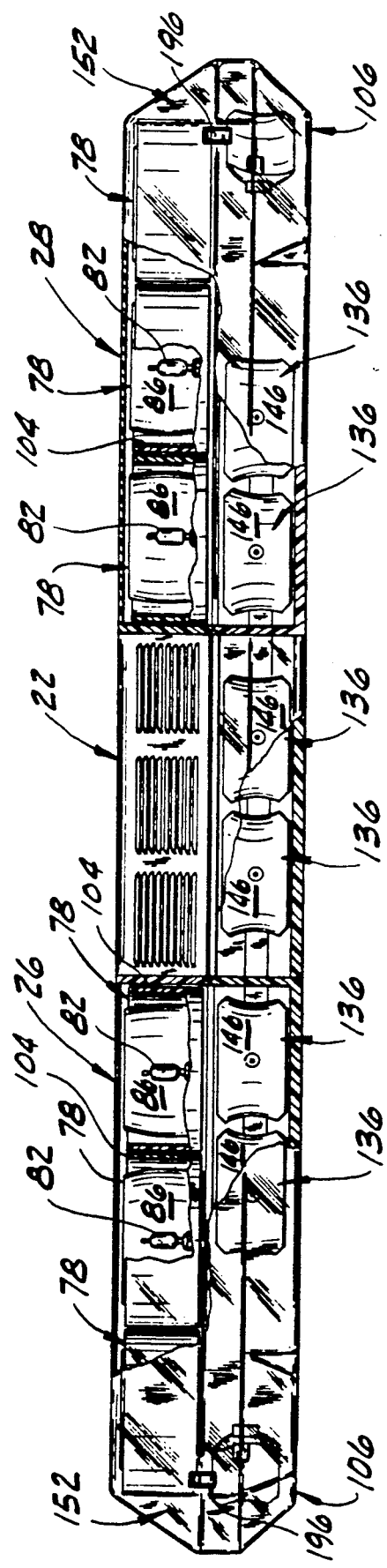
FIG. 11 is a rear elevation of the light bar.
Figure 12:
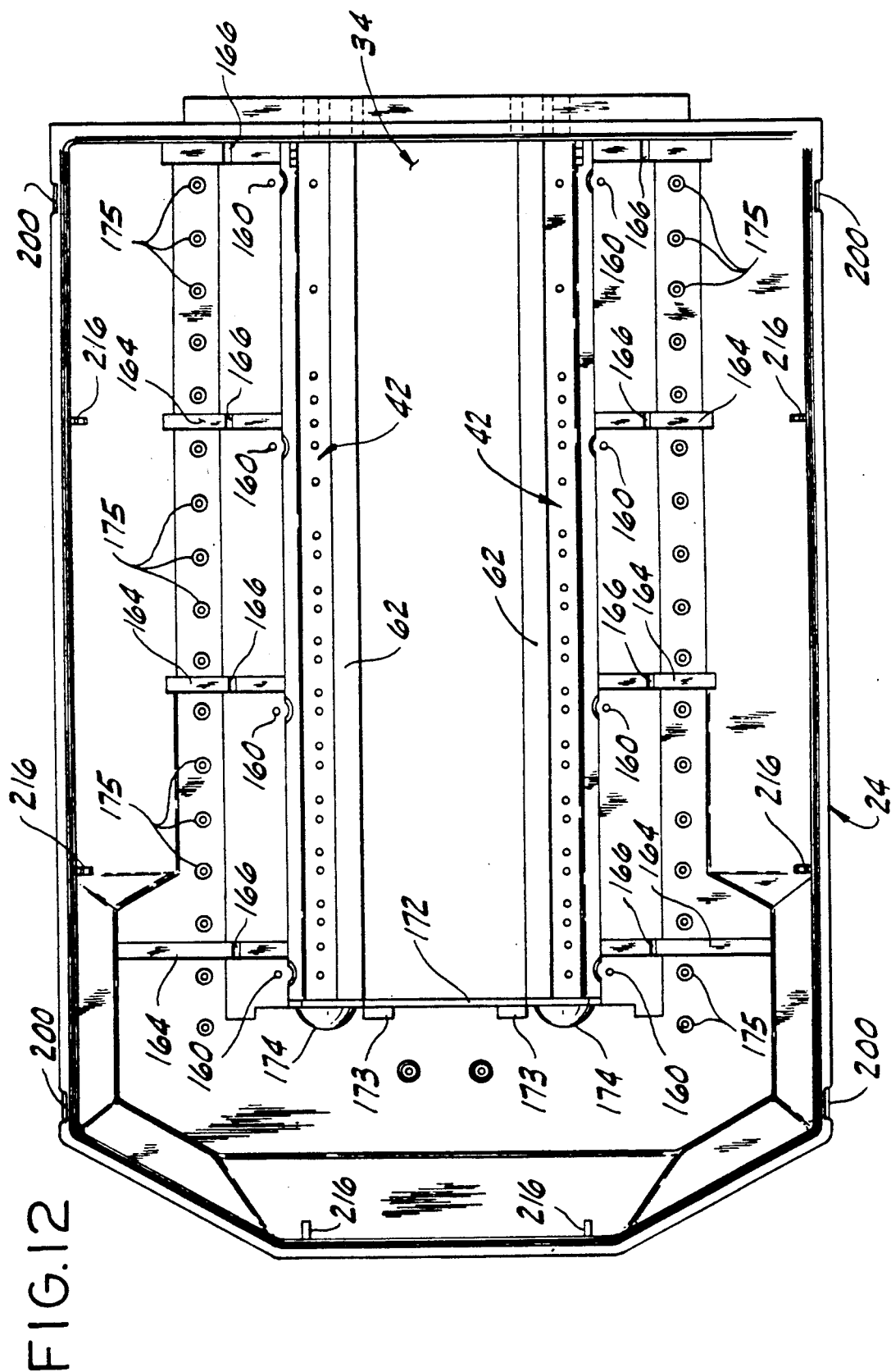
FIG. 12 is a top plan view of the interior of the lower shell, with the contents removed for illustration purposes.

As shown in FIG. 11, the lower layer of the intermediate section 22 could be provided with stationary light units 136, along its rearward face and the lower layer of the driver side and passenger side and sections 24 and 26, could also be provided with stationary light units 136 so that there is a continuous row of stationary light units 136 along the lower layer of the rear of light bar 20, all inside the casing 152. Special control electronics can be provided to operate this row of lights to provide traffic directing signals. For example, the lights, or pairs of them, could be sequentially flashed or turned on from left to right or to give a "right" signal, or in the opposite manner to give a "left" signal. In another mode, the lights may be sequentially flashed or turned on from the center to the ends to signal "left" and "right" simultaneously. In addition to their role in traffic directing signalling, the stationary lights can cooperate in providing the 360° of signal warning light coverage.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A light bar for mounting on an emergency vehicle to provide warning light signals, the light bar comprising at least two vertically spaced lighting layers, each layer having at least one transient light source, the light sources on each layer cooperating to provide a transient high intensity warning light signal 360° around the light bar wherein the light sources of one of the layers sweeps an arc of less than 360°.

2. The light bar according to claim 1 wherein there are two lighting layers, an upper layer and a lower layer and wherein the transient light sources sweep arcs independent of each other.

3. The light bar according to claim 2 wherein the light sources of the upper layer include at least one light having a beam that sweeps 360°.

4. The light bar according to claim 2 wherein the light sources of the lower layer include a plurality of oscillating lights, each having a beam that sweeps an arc of less than 360°.

5. The light bar according to claim 1 further comprising a casing enclosing the light sources, and a divider separating the light sources of at least two of the layers and dividing the casing into at least two vertically spaced layers, the divider including means for permitting air convection between the layers while blocking direct light transmission from the light sources on one layer to the other layer.

6. The light bar according to claim 5 wherein the means for permitting air convection between the layers while blocking direct light transmission from the light sources on one layer to the other layer, comprises louvers in the divider which are shaped and positioned relative to the light sources to allow air convection between the layers while blocking direct light transmission from the light sources on one layer to the other layer.

7. A light bar for mounting on an emergency vehicle to provide warning light signals, the light bar comprising:
    a hollow tube extending substantially the length of the light bar, the tube including a top, a front, and a back, and mounting means projecting from the front and the back of the tube;
    at least one upper light source mounted on the top of the tube;
    at least one lower light source mounted on the mounting means;
    a casing enclosing the upper and lower light sources;
    a divider separating the upper and lower light sources and dividing the casing into two vertically spaced layers, the divider including means for permitting air convection between the layers while blocking direct light transmission from the light sources on one layer to the other layer.

8. The light bar according to claim 7 wherein the means for permitting air convection between the layers while blocking direct light transmission from the light sources on one layer to the other layer comprises louvers in the divider which are shaped and positioned relative to the light sources to allow air convection between the layers while blocking direct light transmission from the light sources on one layer to the other layer.

9. The light bar according to claim 7 wherein the casing comprises at least one set of interfitting upper and lower shell members, and wherein the lower shell members have an opening therein to receive a portion of the tube.

10. The light bar according to claim 7 wherein the tube comprises upper and lower tube sections, the upper tube section having a generally downwardly-facing channel-shaped cross-section, with flanges, constituting the mounting means, projecting forwardly and rearwardly, and the lower tube section having a generally upwardly-facing channel-shaped cross-section.

11. The light bar according to claim 7 wherein the upper light sources cooperate, and the lower light sources cooperate, to each provide a transient high intensity warning signal light 360° around the light bar.

12. The light bar according to claim 11 wherein the upper light sources include at least one light having a beam that sweeps 360°.

13. The light bar according to claim 11 wherein the lower light sources include a plurality of oscillating lights, each having a beam that sweeps an arc of less than 360°.

14. A light bar for mounting on an emergency vehicle to provide warning light signals, the light bar comprising:
 a hollow tube extending substantially the length of the light bar, the tube including a top, a front, and a back, and upper flanges projecting from the front and the back of the tube, and lower flanges projecting from the front and back of the tube;
 at least one upper light source mounted on the top of the tube;
 at least one lower light source mounted on the upper flanges;
 a casing enclosing the upper and lower light sources, the casing comprising at least one set of interfitting upper and lower shell members, the lower shell members having an opening therein for receiving a portion of the tube, the marginal edges of the lower shell members engaging and being supported on the lower flanges;
 a divider separating the upper and lower light sources and dividing the casing into two vertically spaced layers; the divider including means for permitting air convection between the layers while blocking direct light transmission from the light sources on one layer to the other layer.

15. The light bar according to claim 14 wherein the means for permitting air convection between the layers while blocking direct light transmission from the light sources on one layer to the other layer comprises louvers in the divider which are shaped and positioned relative to the light sources to allow air convection between the layers while blocking direct light transmission from the light sources on one layer to the other layer.

16. The light bar according to claim 14 wherein the casing comprises at least two sets of interfitting upper and lower shell members.

17. The light bar according to claim 14 wherein the tube comprises upper and lower tube sections, the upper tube section having a generally downwardly-facing channel-shaped cross-section, with flanges, constituting the upper flanges, projecting forwardly and rearwardly, and the lower tube section having a generally upwardly-facing channel-shaped cross-section, with flanges, constituting the lower flanges, projecting forwardly and rearwardly, at least a portion of the lower flanges forming a horizontal surface, spaced vertically below the upper flanges, for engaging and supporting the lower casing sections.

18. The light bar according to claim 14 wherein the lower flange and the lower shell members overlap, and wherein the lower flanges and the lower shell members define between them a plurality of chambers to inhibit the penetration of water into the interior of the casing.

19. The light bar according to claim 14 further comprising at least one drainage conduit formed between the lower shell members and the lower flanges and extending lengthwise of the light bar, and at least one drainage channel in the bottom of the lower shell members, the drainage channel having an opening therein communicating with the drainage conduit for draining water from inside the casing.

20. The light bar according to claim 14 wherein the upper light sources cooperate, and the lower light sources cooperate, to each provide a transient high intensity warning signal light 360° around the light bar.

21. The light bar according to claim 20 wherein the upper light sources include at least one light having a beam that sweeps 360°.

22. The light bar according to claim 20 wherein the lower light sources include a plurality of oscillating lights, each having a beam that sweeps an arc of less than 360°.

23. The light bar according to claim 22 wherein the lower light sources include a plurality of fixed lights.

24. The light bar according to claim 14 wherein the divider is in substantially the same plane as the juncture between the upper and lower shell members.

25. The light bar according to claim 14 wherein the upper and lower casing is made from a translucent material.

26. The light bar according to claim 14 further comprising an intermediate section intermediate to the ends of the tube, wherein there are upper and lower light sources on each side of the intermediate section, and wherein there are separate sets of upper and lower shell members enclosing the light sources on each side of the intermediate section.

27. The light bar according to claim 14 wherein the upper shell members have a lower edge with a generally downwardly depending lip, the lower shell members have an upper edge with a generally upwardly extending lip, and the lips are adapted to interfit one inside the other when the shells interfit, and further comprising a compressible gasket adapted to be disposed between, and horizontally compressed by, the lips of the upper and lower shell members.

28. The light bar according to claim 27 further comprising backing means, associated with the lip that is outermost when the lips interfit, for holding the innermost lip against the outermost lip to maintain a seal therebetween.

29. The light bar according to claim 27 wherein the compressible gasket comprises a body and a flap depending from the body which is engaged by one of the upper or lower shell members when the upper and lower shell members interfit, to create a seal therebetween.

30. The light bar according to claim 14 further comprising splines on the bottom of the tube, extending substantially the length of the tube, for conducting heat from the tube.

31. The light bar according to claim 14 further comprising at least one track in the bottom of the tube extending generally lengthwise of the light bar, the track adapted for receiving and engaging bolt heads for mounting the light bar on an emergency vehicle.

32. The light bar according to claim 14 wherein the divider comprises a plurality of panels.

33. The light bar according to claim 14 further comprising a plurality of clamps for holding the upper and lower shell members together, each clamp comprising a spring arm pivotally attached to one of the upper or lower shell members, and a recess on the other of the shell members, the spring arm having a shoulder adapted to releasably engage the recess.

34. A light bar for mounting on an emergency vehicle to provide warning light signals, the light bar comprising at least two vertically spaced lighting layers, each layer having at least one light source for providing warning light signals enclosed in at least one casing, at least two of the lighting layers being separated by a divider, the divider including means for permitting air convection between the layers while blocking direct light transmission from the light sources on one layer to the other layer.

35. The light bar according to claim 34 wherein the means for permitting air convection between the layers while blocking direct light transmission from the light sources on one layer to the other layer, comprises louvers in the divider which are shaped and positioned relative to the light sources to allow air convection between the layers while blocking direct light transmission from the light sources on one layer to the other layer.

36. The light bar according to claim 34 wherein the light sources on each layer cooperate to provide a transient high intensity warning light signal 360° around the light bar.

37. The light bar according to claim 36 wherein the light sources on one of the layers include at least one light having a beam that sweeps 360°.

38. The light bar according to claim 36 wherein the light sources on one of the layers include a plurality of oscillating lights, each having a beam that sweeps an arc of less than 360°.

39. The light bar according to claim 34 wherein the rear side of at least one of the layers comprises a plurality of stationary lights, extending substantially the length of the light bar, and means for controlling the lights to operate in a predetermined sequence to give a traffic directing signal 40. The light bar according to claim 39 comprising at least a driver side end section, a passenger side end section, and at least one intermediate section therebetween, and wherein the stationary lights are positioned in each of the sections along the length of the light bar.

41. The light bar according to claim 34 wherein the light sources include at least one oscillating light, having a beam that sweeps an arc of less than 360°, the oscillating light oriented on the light bar so that when the light bar is installed on an emergency vehicle the sweep of the arc passes through a line extending approximately midway between the front of the emergency vehicle and a side of the emergency vehicle.

42. A light bar for mounting on an emergency vehicle to provide warning light signals, the light bar comprising a casing comprising at least one set of interfitting upper and lower shell members, the upper shell member having a bottom edge having a vertical surface and a downwardly depending lip, and the lower shell having an upper edge having a vertical surface opposite the vertical surface of the edge and having an upwardly projecting lip, the lips being adapted to interfit with one lip inside the other with a space between opposing the vertical surfaces of the lips, and a compressible gasket located in the space and adapted to be disposed between, and horizontally compressed by, the opposing vertical surfaces of the lips when the shell members interfit.

43. A light bar for mounting on an emergency vehicle to provide light signals, the light bar comprising at least one light having an oscillable beam that sweeps a generally horizontal arc, the light being oriented with respect to a primary signal direction so that sweep of the arc passes through the primary signal direction with one end of the arc nearer the primary signal direction than the other end so that the oscillation of the light near this one end causes the appearance of a double pulse along the primary signal direction.

44. A light bar for mounting on an emergency vehicle to provide warning light signals, the light bar comprising:

a basing comprising at least one set of intermitting members;

a plurality of stationary lights inside the casing, extending substantially the length of the rear side of the light bar;

means for controlling the lights to operate in a predetermined sequence to give a traffic directing signal; and at least one additional light inside the basing for providing a warning signal other than a traffic directing signal.

* * * * *

UNITED STATES PATENT AND TRADEMARK OFFICE
CERTIFICATE OF CORRECTION

PATENT NO. : 5,091,828
DATED : February 25, 1992
INVENTOR(S) : Danny C. Jincks et al.

It is certified that error appears in the above-identified patent and that said Letters Patent is hereby corrected as shown below:

Column 1, lines 4-5 "mounting vehicles" should read ---mounting on emergency vehicles---.

Column 8, line 59, "Panels" should read ---panels---.

Column 14, claim 44, line 36, "a basing" should read ---a casing---.

Column 14, claim 44, line 36, "of intermitting" should read ---of interfitting---.

Column 14, claim 44, line 44, "the basing" should read ---the casing---.

Signed and Sealed this

Twentieth Day of July, 1993

Attest:

MICHAEL K. KIRK

*Attesting Officer*      *Acting Commissioner of Patents and Trademarks*